United States Patent [19]

Bongers et al.

[11] 3,838,450

[45] Sept. 24, 1974

[54] THERMOMAGNETIC RECORDING AND MAGNETO-OPTIC READING OF A MEDIUM HAVING BISMUTH IONS IN A GARNET STRUCTURE

[75] Inventors: Piet Frans Bongers; Stefan Wittekoek; Theo Johan August Popma, all of Emmasingel, Eindhoven, Netherlands

[73] Assignee: U.S. Philips Corporation, New York, N.Y.

[22] Filed: Jan. 5, 1973

[21] Appl. No.: 321,331

[30] Foreign Application Priority Data

Jan. 8, 1972 Netherlands 7200296
Oct. 7, 1972 Netherlands 7213622

[52] U.S. Cl. 360/59, 252/62.57
[51] Int. Cl. G01d 15/10, G01d 15/12
[58] Field of Search 252/62.57; 346/74 MT; 340/174 YC; 360/59

[56] References Cited

UNITED STATES PATENTS

| | | | |
|---|---|---|---|
| 3,156,651 | 11/1964 | Geller | 252/62.57 |
| 3,281,363 | 10/1966 | Geller et al. | 252/62.57 |
| 3,626,114 | 12/1971 | Lewicki | 346/74 MT |
| 3,781,905 | 12/1973 | Bernal | 346/74 MT |

*Primary Examiner*—Daryl W. Cook
*Assistant Examiner*—Jay P. Lucas
*Attorney, Agent, or Firm*—Frank R. Trifari; Carl P. Steinhauser

[57] ABSTRACT

A device for the thermomagnetic recording and magneto-optical reading of data by means of the Kerr effect, in which the magnetisable recording medium consists of a monocrystalline or polycrystalline material having a garnet structure in which bismuth ions are present in dodecahedral sites and trivalent iron ions are present in tetrahedral sites. An example of a material having such a composition is $Bi_y^{3+}Z_{3-y}^{3+}Fe_3^{3+}O_{12}^{2-}$, wherein Z is a rare earth ion.

6 Claims, 5 Drawing Figures

THERMOMAGNETIC RECORDING AND MAGNETO-OPTIC READING OF A MEDIUM HAVING BISMUTH IONS IN A GARNET STRUCTURE

The invention relates to a memory device for the thermomagnetic recording and magneto-optical reading of data by means of a data recording and storage medium, in which reading takes place by influencing the plane of polarisation of a light beam which is reflected at the area of recorded data by the recording and storage medium.

It is known to read magnetic recordings by means of a so-called magneto-optical effect (British patent specification 833,930). This known method of reading is based on the Kerr effect according to which the plane of polarisation of a linearly polarised light beam experiences a rotation when said light beam is reflected at a magnetised medium. The rotation of the plane of polarisation takes place to the right or to the left, depending upon whether the magnetisation responsible for the rotation influences the light beam with a positive or a negative polarity. When an analyser is placed in the light path of such a reflected light beam, the passed light beam will have different intensities depending upon the occurred rotation of the plane of polarisation.

This property may be used in such manner that magnetic recordings are scanned by means of a focussed light beam, said light beam being reflected by the recording medium at the area of the magnetic recordings. The differences in intensity of the reflected light beam which are detected by means of an analyser represent the recorded magnetic recordings. All this may be carried out, for example, in such manner that an analyser placed in the light path passes a light beam with maximum intensity when a place having a magnetisation of one polarity is scanned and that same passes a light beam with minimum intensity when a place with equally large magnetisation but of opposite polarity is scanned. In this manner, recordings which are recorded magnetically can be read optically.

A known material which has a large Kerr effect is MnBi. This material, however, suffers from the drawback that, in order to be able to thermomagnetically record the information to be read, the material has to be heated locally to the Curie temperature (so-called Curie point recording). The Curie temperature is 360°C so that for recording much energy is required. Additional drawbacks are that the recording time becomes long and that there exists a possibility of interaction between adjacent recording places (bits).

In addition, it is known that so-called iron garnets can be used as a storage material in a magneto-optical memory which is read by means of the Kerr effect. By choosing a suitable composition, the Curie temperature of iron garnets can be adjusted at a low value. The drawbacks of the known garnets is that the Kerr effect is comparatively small.

The object of the invention is to provide a recording and storage medium of a material which has both a low Curie temperature and a large Kerr effect.

For that purpose, the memory device according to the invention employs as a recording and storage medium of a mono- or polycrystalline material having a garnet structure in which up to 60 % of the dodecahedral sites are occupied by bismuth ions and tetrahedral sites by trivalent iron ions.

It has been found that materials having a garnet structure in which bismuth ions are present in dodecahedral sites and trivalent iron ions are present in tetrahedral sites show a Kerr effect which is large for this type of materials, have a low Curie temperature (for example 130°C), dependent upon the chemical composition, and are chemically stable. It has been found that the Kerr effect of this type of materials is large in the whole visible range, in particular between 4000 and 5500 A, so that for reading a "white" light source may also be used instead of a laser source producing a light beam having a sharply defined wavelength.

A first material which satisfies said conditions has the composition:

$Bi_y^{3+}\ Y_{3-y}^{3+}\ Fe_2^{3+}\ Fe_3^{3+}\ O_{12}^{2-}$ ,
with $0.5 \leq y \leq 1.7$.

It has been found that the value of the rotation of the plane of polarisation increases when the bismuth content increases. The upper limit of y is determined by the bismuth content maximum to be realised, the lower limit by a value of the rotation of the plane of polarisation which is still useful.

According to a preferred embodiment of the device according to the invention, the material has the composition:

$Bi_y^{3+}\ Y_{3-y}^{3+}\ [Fe_{2-x}^{3+}\ A_x^{3+}]\ Fe_3^{3+}\ O_{12}^{2-}$,
with $0.5 \leq y \leq 1.7$ and $0 \leq x \leq 1.3$, wherein $A^{3+}$ is a trivalent ion or a combination of ions having an average charge of three. $A^{3+}$ is, for example, $In^{3+}$, (Sn+B)/2, (Zr+B)/2 or (Sb+C)/2, where B is a bivalent and C a monovalent ion. $(2Me^{2+}+Sb^{5+})/3$ is also possible. The advantage of the replacement of a part of the $Fe^{3+}$ ions in octahedral sites by A ions is that the Curie temperature of the starting material is reduced. For example, the material from the above series with A=In and $x$=0.7 has a Curie temperature in the proximity of 130°C.

According to a preferred embodiment of the device according to the invention, the material has the composition:

$Bi_y^{3+}\ Y_{3-x-y}^{3+}\ Ca_x^{2+}\ Zr_x^{4+}\ Fe_{5-x}^{3+}\ O_{12}^{2-}$,
with $0<y \leq 1.7$ and $0<x \leq 1.35$.

For example, the material from the above series with $y$=1,2 has a Curie temperature in the proximity of 40°C.

The provision of data in a magnetised recording medium for optically reading is possible in various manners.

It is possible to record data by means of a conventional magnetic head, to duplicate them from an already written other recording medium which is present in the proximity of or in contact with the recording medium and has a higher coercive force, or to write them thermomagnetically by local heating to the Curie temperature by means of a beam of radiation energy (the already mentioned Curie point recording). In the latter case, the switching field of the recording medium decreases during the irradiation time and a signal-carrying external magnetic field is then capable of reversing the direction of the magnetisation in the irradiated place.

As a refinment of the Curie point recording, it is known to use for thermal recording purposes ferrimagnetic materials having a compensation temperature which lies as close to room temperature as possible.

The crystal structure of the materials in question is characterized by sublattices of opposite magnetisation, while the resultant of the opposite magnetisations of the sub-lattices as a function of temperature shows a point at which it passes through zero. This point is called the compensation point. Associated with the passage through zero of the resultant of the magnetisations is a strong increase of the coercive force and it is this strong temperature dependence of the coercive force on which the possibility of application of the said materials is based in particular. In the known device, a plate of ferrimagnetic material is kept at a temperature which is as much as possible equal to the compensation temperature and a pulsatory beam of radiation energy is directed onto a desired information storage place so as to temporarily increase the temperature at that area and hence produce a temporary spontaneous magnetisation of the irradiated places. The energy required for this purpose, however, is considerably smaller than the energy required in the so-called Curie point recording. Simultaneously, a pulsatory magnetic field with a suitable field strength switched on so as to orient the magnetisation of the irradiated place in accordance with the presented binary information in a positive or negative sense, without the surrounding placed being influenced. In this manner, binary information is stored in the form of an orientation of the magnetisation in a number of successive places by the combined action of a radiation beam and a magnetic field. In this case also, reading of the stored information may take place by means of the Kerr effect.

The known materials having a compensation point, however, suffer from the drawback that they cannot or hardly be read in reflection, because the Kerr effect is very small.

A second material satisfying the above-mentioned conditions has the composition $Bi_y^{3+}\ Z_{3-y}^{3+}\ Fe_2^{3+}\ Fe_3^{3+}\ O_{12}^{2-}$, with $0.5 \leq y \leq 1.7$, wherein Z is an element of the rare earths, preferably gadolinium.

It has been found that such a material has a compensation temperature for the magnetisation and that, compared with the known materials used in devices for the compensation point recording, it has a much larger Kerr effect as a result of which it is very suitable for reading by means of the Kerr effect.

According to a preferred embodiment of the device according to the invention, the material has the composition:

$Bi_y^{3+}\ Z_{3-y}^{3+}\ Fe_2^{3+}\ [Fe_{3-z}^{3+}\ Me_z^{3+}]\ O_{12}^{2-}$, with $0.5 \leq y \leq 1.7$ and $0.1 \leq z \leq 0.7$, wherein $Me^{3+}$ is a trivalent ion or a combination of ions having an average charge of three. $Me^{3+}$ is, for example, $Ga^{3+}$ or $Ge^{4+}$ or $V^{5+}$. In the last two cases, a part of the $Fe^{3+}$ ions should be replaced by monovalent or bivalent ions, so that the average charge of the substituted ions is three, for example, $(2Me^{2+}+V^{5+})/2$.

By a suitable choice of $z$ within the stated limits, the compensation temperature of such a material can be adjusted at a desired temperature. In the series $Gd_{3-y}Bi_y\ Fe_2\ Fe_{3-z}\ Ga_zO_{12}$ the compensation temperature lies at 310°K (±10°K) for, for example, ($y$=1,0; 0,1 $\leq x \leq$ 0,2) and for ($y$=1,5; 0,2 $\leq x \leq$ 0,4).

The invention will be described in greater detail with reference to the drawing.

Figure 1:
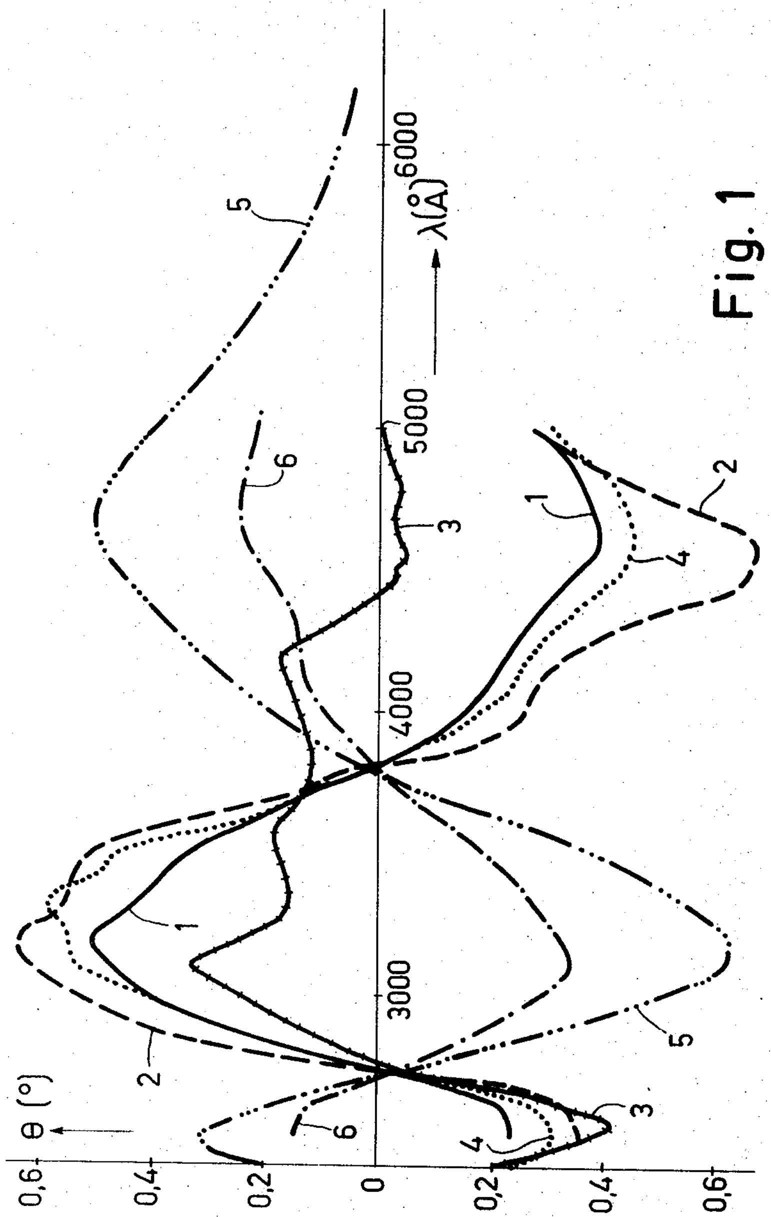
FIG. 1 is a graphic representation of the value of the Kerr rotation $\theta$ as a function of the wavelength of the irradiated light for various materials according to the invention and for a known material.

FIG. 1 shows the results of Kerr rotations measured in six different materials. The light beam used was incident substantially at right angles to the surface of the material. The Kerr rotation for each of the materials is given as a function of the wavelength of the radiation used.

Curve 1 represents the behaviour of $Bi_{0.8}Y_{0.8}Ca_{1.4}Fe_2$-$Fe_{2.3}V_{0.7}O_{12}$ Curve 2 represents the behaviour of $Bi_{0.8}Y_{2.2}Fe_2$-$Fe_3O_{12}$ Curve 3 represents the behaviour of $Y_3Fe_5O_{12}$ Curve 4 represents the behaviour of $Bi_{0.8}Y_{1.1}Ca_{1.1}Fe_2$-$Fe_{2.45}V_{0.55}O_{12}$ Curve 5 represents the behaviour of $Bi_{0.8}Ca_{2.2}Fe_2$-$Fe_{1.9}V_{1.1}O_{12}$ Curve 6 represents the behaviour of $Bi_{0.8}Y_{0.2}Ca_2Fe_2$-$Fe_2V_{1.0}O_{12}$ Comparison of the curves shows that in the tested series $Ca_{3-p-y}\ Bi_y\ Y_p\ Fe_2\ Fe\ (3+p+y)/2\ V\ (3-p-y)/2\ O_{12}$ with $y$=0.8, the value of the Kerr rotation increases with increasing $p$. On the basis of the crystal structure of the material, it was found that with an increasing number of $Fe^{3+}$ ions in the tetrahedral sites the value of the Kerr rotation increases. Moreover, with an increasing number of $Fe^{3+}$ ions in the tetrahedron places, a compensation of the sub-lattices occurs in this system as a function of $p$. As a result of this, a reversal of the sign of the Kerr rotation occurs.

It is to be noted that the curves 1, 2, 4 and 6 represent the behaviour of polycrystalline material, while curve 5 represents the behaviour of a monocrystalline material. A monocrystalline material gives a larger Kerr rotation than a polycrystalline material of the same composition.

In the cases 1, 2, 4, 5, 6 the "Kerr-spectrum" is identical, with a peak at a wavelength of 4700 A. For comparison, curve 3 represents the behaviour of $Y_3Fe_5O_{12}$ (yttrium-iron garnet). Outside the visible range, $Y_3$-$Fe_5O_{12}$, as well as the bismuth-doped materials, shows a maxima Kerr rotation at $\lambda \approx 3150$ A and at $\lambda \approx 2550$ A; In the visible range, the Kerr rotation, however, is much smaller, while it is remarkable that, in contrast with the bismuth-doped material, no maximum occurs at $\lambda$=4700 A. On the basis of the crystal structure of the tested materials, this leads to the conclusion that a large Kerr rotation in the visible range can be obtained by introducing into materials having a garnet structure bismuth ions in dodecahedral sites.

By substitution of $Bi^{3+}$ (or $Y^{3+}$) by rare earths ions, preferably $Gd^{3+}$, in the materials according to the invention, materials having a compensation temperature can be obtained. An example of a material having such a composition is $Gd_{3-y}Bi_y Fe_2 Fe_3 O_{12}$ with $0.5 \leq y \leq 1.7$.

In order to realise a compensation temperature in the proximity of room temperature and nevertheless have bismuth in the lattice, it is necessary that the "$Fe_{tetrahedral}$ magnetisation" is reduced. This is achieved by substitution of a non-magnetic ion which is known to settle in tetrahedral sites. Examples hereof are $Ga^{3+}$, $Al^{3+}$, $Si^{4+}$, $Ge^{4+}$ and $V^{5+}$. If the non-magnetic ions are quadrivalent of pentavalent, a charge compensation should be used by substitution of a bivalent (for example $Ca^{2+}$) or monovalent ion. An example of a material having such a composition is $Gd_{3-y-x}Bi_yCa_xFe_2Fe_{3-(x/2)}V_{x/2}O_{12}$. When the requirement is imposed that the materials according to the invention should have a low Curie temperature (which is of importance in recording information by means of Curie point recording), this can be achieved by replacing in the starting material iron ions in octahedral sites by non-magnetic ions of which it is known that in a garnet structure they preferably settle in octahedral sites. Examples hereof are $In^{3+}$, $Sn^{4+}$ and $Sb^{5+}$. Substitution of these ions provides the additional advantage that the Kerr rotation in the visible range is extra high since the contribution of iron ions in octahedral sites which is opposite to that of iron ions in tetrahedral sites is reduced. An example of a material as mentioned above is $Y_{3-y}Bi_y Fe_{2-x}In_x Fe_3O_{12}$. When herein $Y^{3+}$ is replaced by a rare earth ion, for example $Gd^{3+}$, it is achieved that the magnetisation becomes smaller with which the demagnetising field also becomes smaller. This consideration also applies to the other said materials.

The preparation of the polycrystalline materials in question is possible by means of the conventional method of preparing polycrystalline garnets by grinding the starting materials, presintering at a temperature between 500° and 900°C and finally sintering them at a higher temperature.

Figure 2:
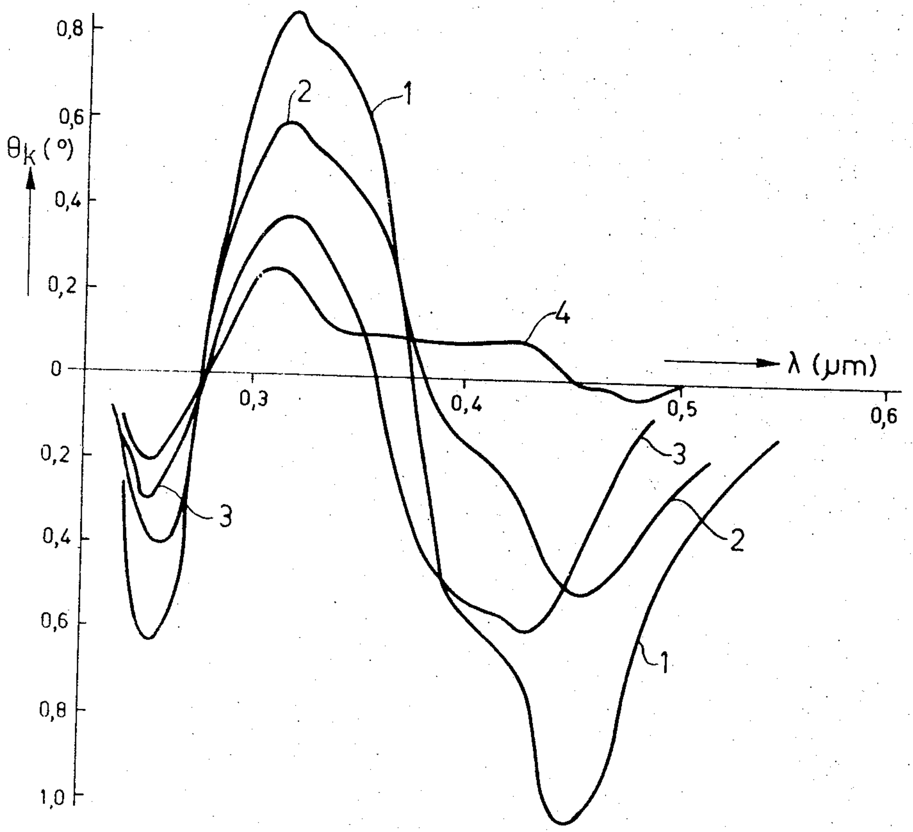
FIG. 2 is a graphic representation of the value of the Kerr rotation $\theta_K$ as a function of the wavelength of the irradiated light for a number of iron garnets having different bismuth contents.

FIG. 2 shows the results of Kerr rotations $\theta_K$ measured in four different iron garnets. The light beam used was incident substantially at right angles to the surface of the material. For each of the materials, the Kerr rotation is given as a function of the wavelength of the radiation used.

Curve 1 represents the behaviour of polycrystalline $Y_2Bi_1Fe_5O_{12}$.

Curve 2 represents the behaviour of monocrystalline $Y_{2.6}Bi_{0.4}Fe_5O_{12}$.

Curve 3 represents the behaviour of polycrystalline $Y_1Ca_1Bi_1Fe_4Zr_1O_{12}$.

Curve 4 represents the behaviour of polycrystalline $Y_2Ca_1Fe_{4.5}V_{0.5}O_{12}$.

Comparison of the curves proves that the Kerr rotation increases when the bismuth content increases. At a wavelength of 0.45 $\mu$m, the material of the composition $Y_2Bi_1Fe_5O_{12}$ shows a maximum rotation of more than 1°.

Figure 3:
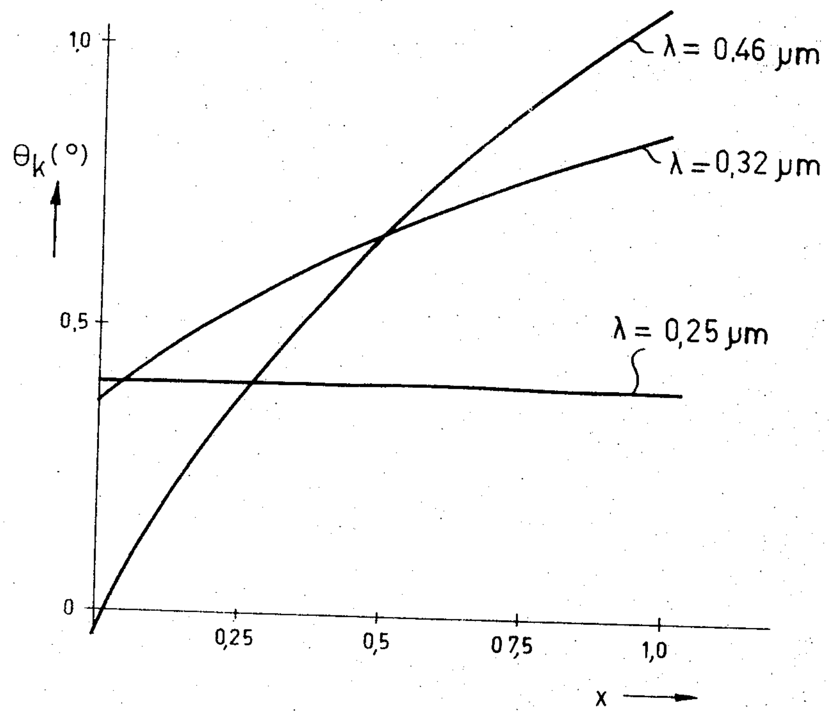
FIG. 3 shows the Kerr rotation in three spectral maxima as a function of the bismuth content.

FIG. 3 shows the Kerr rotation in three spectral maxima as a function of the bismuth concentration.

Figure 4:
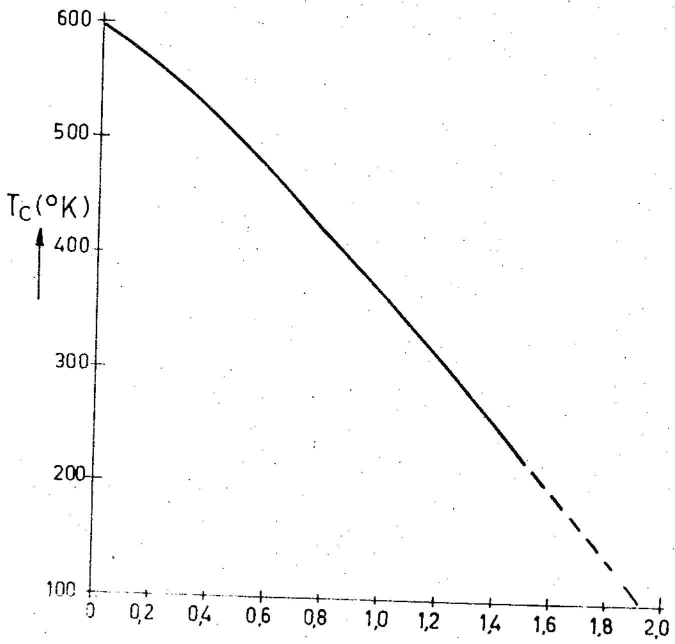
FIG. 4 shows the relationship between the Curie temperature and the zirconium concentration of materials having the composition $Bi_1Y_{2-y}Ca_yZr_yFe_{5-y}O_{12}$.

One of the possibilities of recording magnetic information is the so-called Curie point recording. In order to be able to record rapidly with a laser beam of not too large a power, it is favourable when the Curie point does not lie too far above room temperature. Bismuth-containing iron garnets having a low Curie point can be obtained by replacing a part of the iron in the octahedral sites by zirconium. This is shown in FIG. 4 in which the zirconium content $y$ of materials having the composition $Bi_1Y_{2-y}Ca_yZr_yFe_{5-y}O_{12}$ are plotted on the horizontal and the Curie temperature Tc in °K is plotted on the vertical axis.

Figure 5:
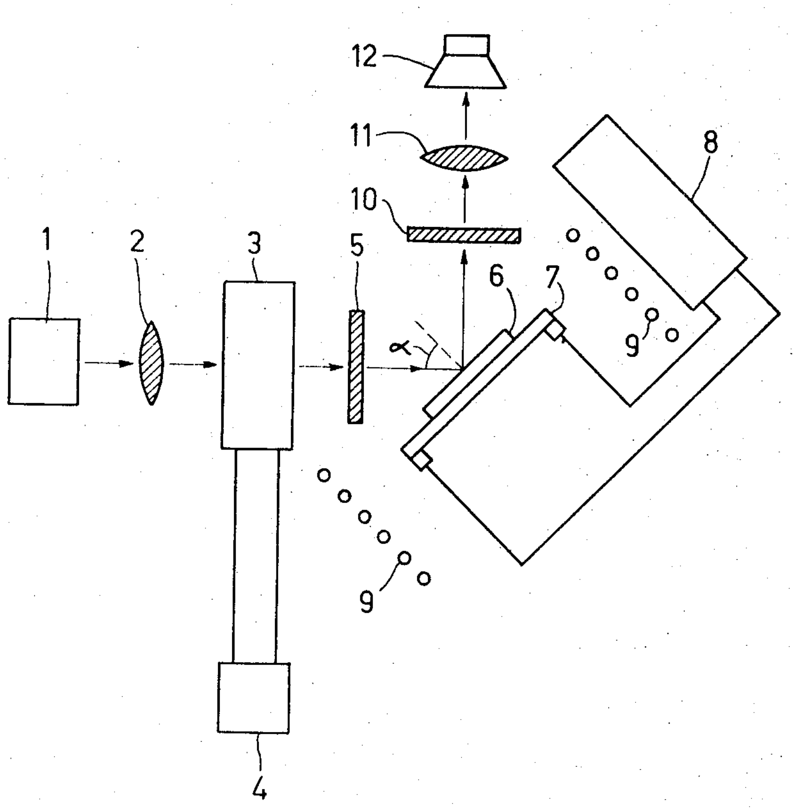
FIG. 5 shows a device for storing data with optical reading according to the invention.

FIG. 5 shows a device for data storage with optical reading according to the invention, partly in the form of a drawing and partly in the form of a block diagram. The device comprises a data storage unit containing a layer of magnetisable material 6 of garnet structure which is mounted on a plate 7. The magnetisable material has one of the above-mentioned compositions and is kept at a constant temperature by the temperature control device 8 which is connected to the plate 7, and which temperature is equal as much as possible to the compensation temperature of the material of the layer 6. For recording the data to be stored, the device comprises a source of radiation 1. This may be, for example, a laser. By means of this source, radiation pulses are produced which, after focusing by the lens and deflection by the deflection device 3, impinge upon a selected place, or address, of the layer 6. (For clarity, the angle $\alpha$ which the incident light beam makes with the normal is shown on a strongly exaggerated scale. Actually, $\alpha$ is rather small, in order of a few degrees.) In this place, a temporary spontaneous magnetisation is produced by the increase in temperature which is produced by the incident radiation. The selection of the place is ensured by the address device 4. Simultaneously, a pulsatory magnetic field having a suitable field strength is switched on by energising the coil 9 so as to orient the magnetisation of the irradiated place in accordance with the presented binary information in a positive or in a negative sense without the surrounding places being influenced. For reading the stored information, a polariser 5 is arranged between the deflection device 3 and the layer 6, and an analyser 10, a lens 11 and a photoelectric cell 12 is this sequence are arranged in the direction of the reflected beam. For reading, the source of radiation 1 is designed for supplying a radiation beam of lower energy than for recording, since it is not desirable for the layer 6 to be heated by the reading beam. The analyser 10 is rotated so that the light which is reflected by the parts of the layer 6 which are magnetised in a previously determined direction, is extinguished. So light impinges upon the photo-electric cell 12 only which is reflected by the parts of the layer which are magnetised in a direction opposite to the first-mentioned direction.

What is claimed is:

1. A memory device for the thermomagnetic recording and magneto-optical reading of data comprising a recording and storage medium consisting of a monocrystalline or a polycrystalline material having a garnet structure in which up to 60 percent of the dodecahedral sites are occupied by bismuth ions and tetrahedral sites are occupied by trivalent iron ions, means to maintain said storage and recording medium at a substantially constant temperature, a source of radiation, means to impinge radiation from said source on said recording and storage medium to produce a temporary spontaneous magnetization therein by a rise in temperature produced by the incident radiation, means to produce a pulsatory magnetic field having a given strength for orienting the magnetization of the selected area without influencing surrounding areas, and means for reading the information stored in said medium comprising radiation means for scanning said recording and storage medium without heating the same, means to polarize reflected radiation and means to detect radiation reflected by the medium containing stored information in magnetized areas thereof.

2. A device as claimed in claim 1 wherein the material has the composition $Bi_y^{3+}Y_{3-y}^{3+}Fe_2^{3+}Fe_3^{3+}O_{12}^{2-}$ with $0.5 \leq y \leq 1.7$.

3. A device as claimed in claim 1, wherein the material has the composition $Bi_y^{3+}\ Y_{3-y}^{3+}\ [Fe_{2-x}^{3+}\ A_x^{3+}]\ Fe_3^{3+}\ O_{12}^{2-}$, with $0.5 \leq y \leq 1.7$ and $0 \leq x \leq 1.3$, wherein $A^{3+}$ is a trivalent ion or a combination of ions having an average charge of three.

4. A memory device as claimed in claim 3, wherein the material has the composition $Bi_y\ Y_{3-x-y}\ Ca_xZr_xFe_{5-x}O_{12}$, with $0 \leq y \leq 1.7$ and $0 < x \leq 1.35$.

5. A device as claimed in claim 1, wherein the material has the composition $Bi_y^{3+}\ Z_{3-y}^{3+}\ Fe_2^{3+}\ Fe_3^{3+}\ O_{12}^{2-}$, with $0.5 \leq y \leq 1.7$, wherein $Z^{3+}$ is a rare earth ion.

6. A device as claimed in claim 1, wherein the material has the composition $Bi_y^{3+}\ Z_{3-y}^{3+}\ Fe_2^{3+}\ [Fe_{3-z}^{3+}\ Me_z^{3+}]\ O_{12}^{2-}$, with $0.5 \leq y \leq 1.7$ and $0.1 \leq z \leq 0.7$, wherein $Me^{3+}$ is a trivalent ion or a combination of ions having an average charge of three.

* * * * *

PO-1050
(5/69)

UNITED STATES PATENT OFFICE
CERTIFICATE OF CORRECTION

Patent No. 3,838,450 Dated September 24, 1974

Inventor(s) [illegible] PIET FRANS BONGERS ET AL

It is certified that error appears in the above-identified patent and that said Letters Patent are hereby corrected as shown below:

Column 4, line 41, change "tetrahedron places" to read --tetrahedral sites--

In Claim line 61 and 62, change "temporary spontaneous" to read --change of the--.

Signed and sealed this 22nd day of April 1975.

(SEAL)
Attest:

RUTH C. MASON
Attesting Officer

C. MARSHALL DANN
Commissioner of Patents and Trademarks